UNITED STATES PATENT OFFICE.

ROBERT F. NENNINGER, OF NEWARK, NEW JERSEY.

PROCESS OF MANUFACTURING COMPOSITION FOR FLOOR AND WALL COVERINGS, &c.

SPECIFICATION forming part of Letters Patent No. 342,378, dated May 25, 1886.

Application filed October 13, 1885. Serial No. 179,796. (No specimens.)

*To all whom it may concern:*

Be it known that I, ROBERT F. NENNINGER, of Newark, Essex county, New Jersey, have invented a new and useful Improvement in Processes for the Manufacture of Materials for Floor and Wall Coverings, &c., of which the following is a specification.

My invention relates to a process for the manufacture of a material capable of many useful applications—such as for floor and wall covering—as a substitute for leather or cork, and for other purposes to which an elastic, tough, flexible, water-proof body may be adapted. The composition of the said material is the subject of another application for Letters Patent filed by me simultaneously herewith and serially numbered 179,795, and is herein disclaimed.

The aforesaid composition consists of any fiber, preferably short—such as linen, cotton, or jute—as prepared, for example, in pulp for paper making, mineral or animal wool, any felting material—such as hair or fur—and so on through a great variety of substances. With this fiber I combine any suitable water-proof, resinous, or gummy substance which can be dissolved in volatile fluid—such as a light hydrocarbon—and after evaporating the hydrocarbon I obtain a body all the fibers of which are apparently coated with the gum, and which is elastic, tough, flexible, and capable of being consolidated or compacted by pressure into desired forms.

My process for the manufacture of this composition is as follows: The fiber selected being first cleansed, if necessary, is preferably brought into some aggregate form. Thus, for example, in using paper-pulp, I allow the same to be deposited from the slip upon the screen in the usual way, and thence to pass to the felted rollers. When the pulp is dry, but before it is pressed or calendered, I take it from the rollers in suitable lengths. It is then of loose fibrous texture and bibulous, so that any thin liquid will readily penetrate throughout its mass. I prepare the liquid to be applied preferably by heating linseed-oil to a high temperature until it becomes a gummy viscous mass. This I dissolve in a suitable light hydrocarbon—such as naphtha. The resulting thin fluid I apply to the fibrous body, by which it is at once absorbed, and apparently all of the fibers become coated with the gum. My next step is to apply heat to the said body, in any suitable way, until the hydrocarbon solvent is volatilized and driven off. The viscous gum remaining then agglutinates together the fibers, and there is produced a body having the characteristics already noted. This body I compress between rollers into sheets or press into any desired form.

I do limit myself to the particular composition of matter herein described, because, as already stated, I may use any suitable fiber; and in lieu of the gummy substance derived from linseed-oil I may employ india-rubber dissolved in turpentine or other suitable volatile solvent, and this rubber after the solvent has been expelled may be vulcanized.

The last step of my process—namely, the pressing—may be omitted, if desired, and the material left in its original form, which, in the case of paper-pulp, would be that of a thin sheet.

I am aware that is not new first to combine with paper-pulp a water-proof substance, and, second, to mold the same into shape, the pulp and water proofing material being made into a plastic mass to which form is subsequently given. This process I do not herein claim, inasmuch as I believe it to be inoperative to produce successful results.

I claim as my invention—

The process of manufacturing an elastic flexible body herein set forth, which consists, first, in molding or pressing any fibrous material into desired shape and drying the same; second, treating said material with a gummy or resinous water-proof substance dissolved in a volatile solvent, and, third, evaporating said volatile solvent, substantially as described.

ROBERT F. NENNINGER.

Witnesses:
PHILIP J. O'REILLY,
JOHN BRICE.